Patented Apr. 22, 1930

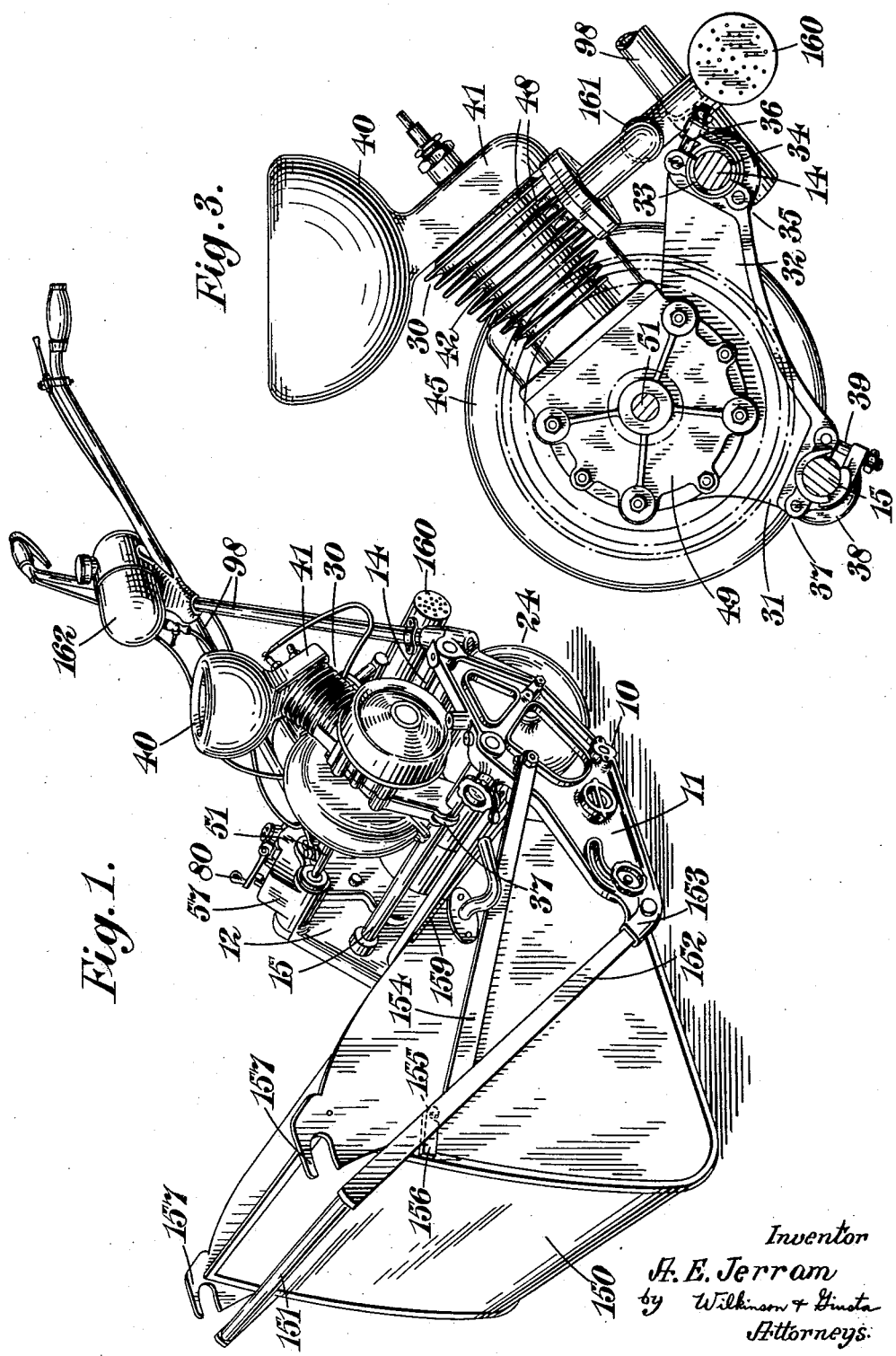

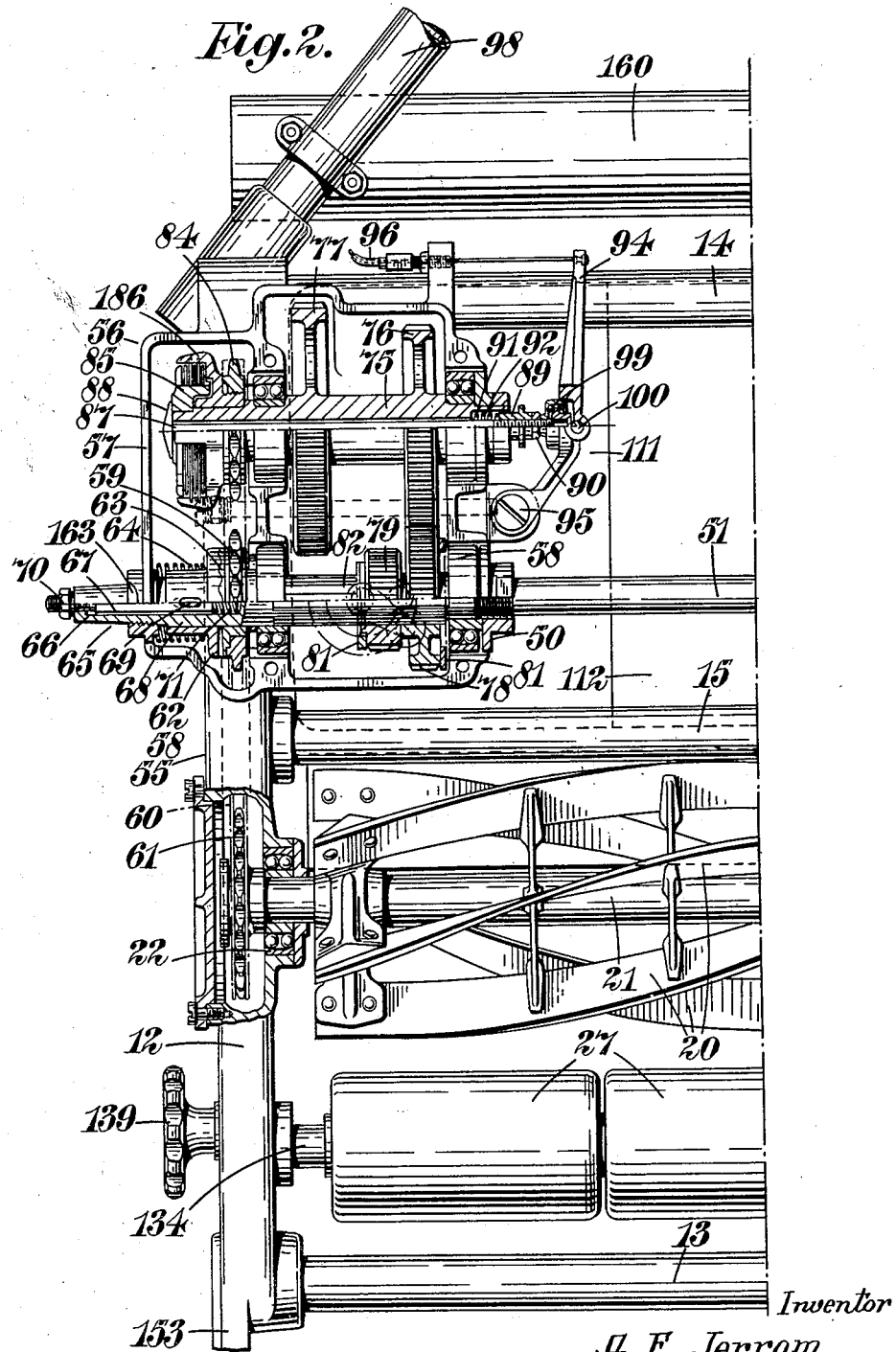

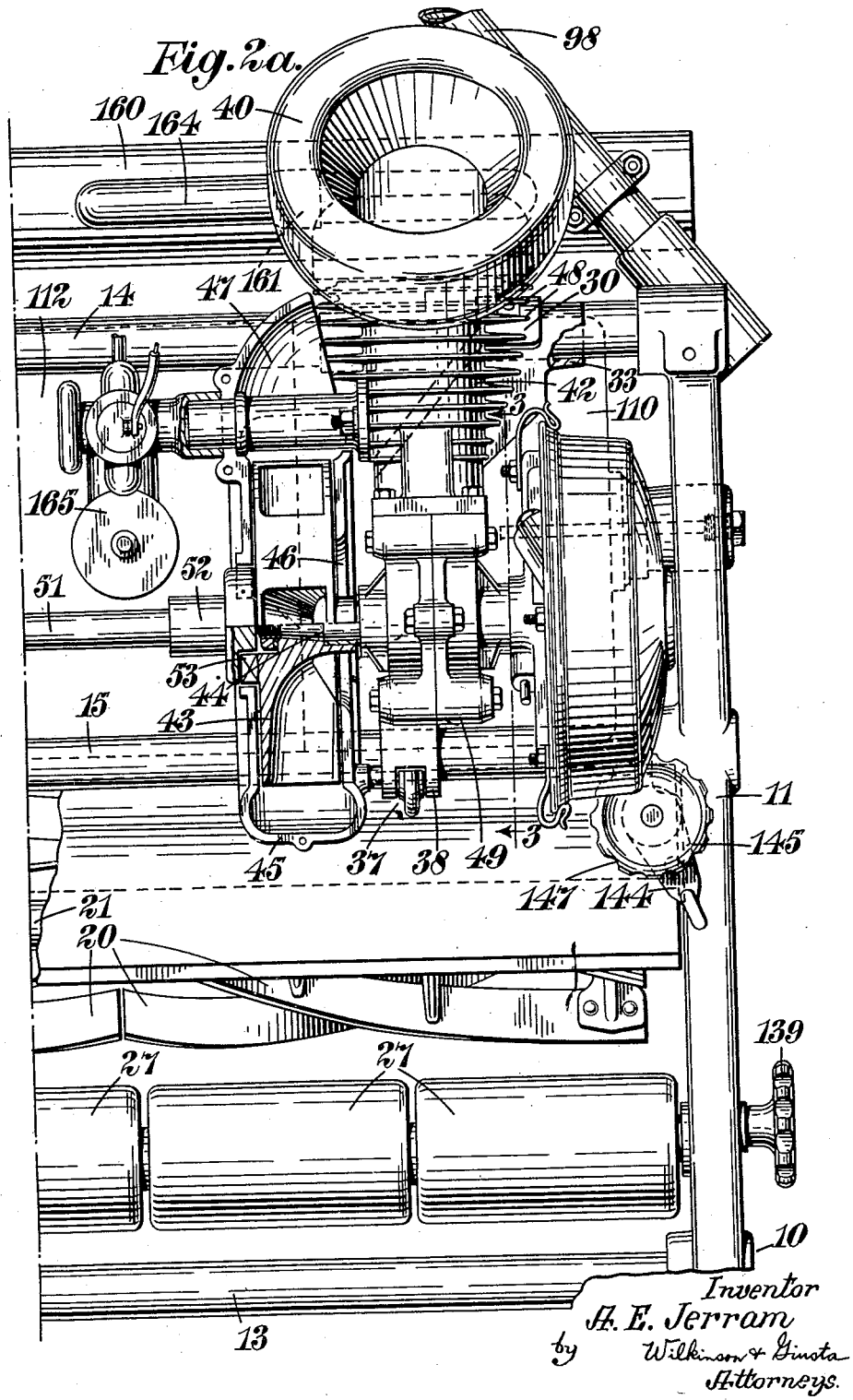

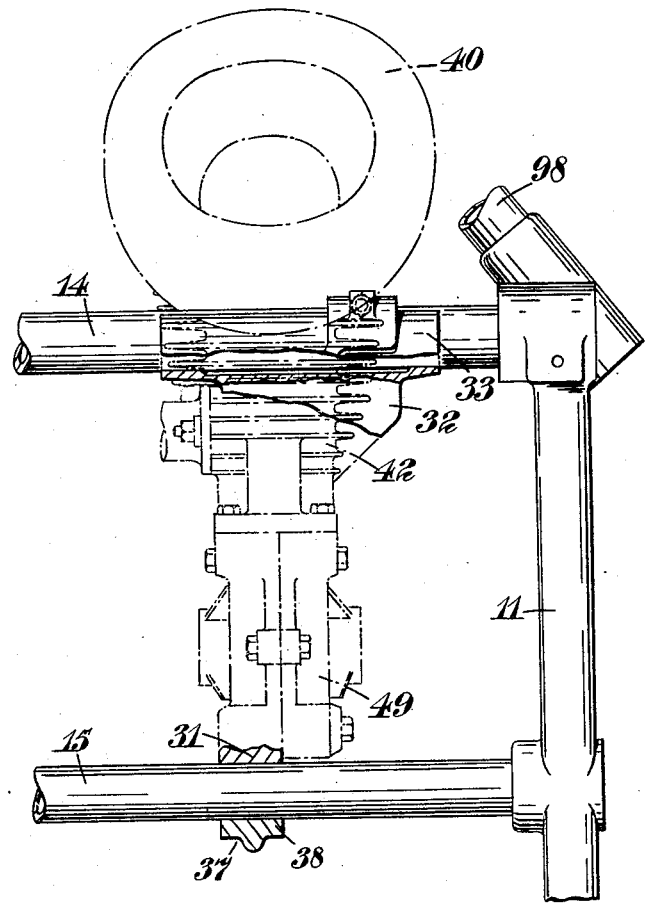

1,755,958

UNITED STATES PATENT OFFICE

ARTHUR ERNEST JERRAM, OF OADBY, ENGLAND

POWER-DRIVEN LAWN MOWER

Original application filed March 23, 1927, Serial No. 177,791, and in Great Britain April 1, 1926. Divided and this application filed January 20, 1928. Serial No. 248,196.

This invention is for improvements in or relating to power-unit-driven lawn-mowers. Such machines comprise a large number of mechanisms of different kinds, including the power-unit, a cutter, a driving roller, and transmission mechanisms between the power-unit, the cutter and the roller. Heretofore such machines as have been manufactured comprise aggregations of a lawn-mower and a petrol motor designed for other uses, with the result that the transmission mechanism has been inefficient and indirect, and the structure weak, top-heavy, and unduly cumbersome, the machines requiring considerable care and attention to keep them up to their work. As such machines are frequently worked under very severe and varying conditions exposed to the weather and dirt and are used by persons, such as gardeners, who are not skilled mechanics it is very important that each of these mechanisms, and particularly the power-unit, shall be well designed and skilfully arranged in conjunction with the rest in order to contribute to the satisfactory working of the machine as a whole with a minimum of attention.

This invention has for its main object to provide an improved power-unit-driven lawn-mower that fulfils the above-mentioned conditions, and from which the power-unit can be readily removed and replaced by unskilled labour in case of need by loosening or securing only a minimum of attachment devices. Another object is to provide an improved arrangement of water cooling of such a readily removable power-unit in the form of an internal-combustion engine, whereby the defects of water-cooled motors having a radiator arranged as is usual in motor-car practice are obviated.

According to an important feature of the invention, there is provided in a power-unit-driven lawn-mower the combination of (a) a withdrawable power-unit having quick release and clamping devices, (b) a "fixed-centre" driven shaft co-axial with the driving shaft (e. g. crankshaft) of the power-unit, (c) guiding surfaces adapted to control the motion of withdrawal or replacement of the power-unit in a predetermined direction, and (d) a driving connection between said driving shaft and said driven shaft that is separable by the said controlled motion of withdrawal of the power-unit, with or without (e) an exhaust connection so arranged as to be disconnected and connected by the aforesaid controlled motion, whereby the power-unit can be readily removed from the machine as a separate unit by loosening the clamping devices, so that in the event of break-down or failure of the power-unit it can be readily removed from the machine and a spare unit can be readily substituted therefor and fixed in its operative position on the mower without performing any operations requiring skilful manipulation.

The term "fixed-centre" used herein in relation to the driven shaft is intended to mean that the axis of rotation of the driven shaft is fixed in relation to the frame of the mower.

Conveniently, the clamping devices secure the crank-case of the power-unit to the machine at only three points.

Preferably, the said guiding surfaces co-operate with guiding devices in the form of two slide-bars constituting cross-members of the frame of the mower, with which slide-bars the power-unit may be supported at three points, at which points readily releasable clamping devices may engage the slide-bars.

According to another important feature of the invention, there is provided a power-unit-driven lawn-mower as set forth in the preceding paragraphs, wherein a power-unit in the form of a water-cooled internal-combustion engine disposed in a slanting position has a water-supply tank of the hopper type that is formed or provided directly on the detachable or other head of the engine and is open above to the atmosphere, which lawn-mower is characterized in that the supply tank, for example a hemispherical tank, preferably situated in view of the operator of the mower when in use, opens into the upper portion of the body of a water-jacket which is, for the purpose described hereinafter, in the form of an annular chamber at the cylinder head and surrounds only a short length of the cylinder at the end adjacent the head.

Other features of the invention will be described hereinafter and pointed out in the appended claims.

One embodiment of the invention is diagrammatically illustrated by way of example in the accompanying drawings. In said drawings—

Figure 1 is a perspective view of a complete power-driven lawn-mower provided with a power-unit according to the invention;

Figures 2 and 2ª are a plan thereof, with some parts removed and others broken away and partly in section, and Figure 3 is a section taken on the line 3—3 in Figure 2ª showing the power-unit and its fastening clips in side elevation.

Figure 4 is a horizontal section taken through the lower part of the engine and through its supporting arms.

The figures are drawn to different scales, but like reference numerals designate like parts throughout the several views.

Referring to the drawings, the power-driven lawn-mower (Figure 1) has a frame designated generally by the numeral 10, comprising two side members 11, 12 connected together by three main cross members 13, 14, 15 in the form of stretcher rods arranged one, 13, at the front, a second, 14, at the rear, and a third, 15, near the middle of the side members 11, 12; the second and third stretcher rods 14, 15 are substantially in the same general longitudinal plane at the top of the side members 11, 12. Other cross members in the form of distance rods may extend between the side members below the middle stretcher rod 15.

A rotary cylindric cutter 20 has its shaft 21 journalled in ball-bearings at 22 and 23 in the side members between the stretcher rods 13 and 15 so as to be readily detachable in any convenient manner, but preferably as described in my prior Patent No. 1,486,758. A driving or back roller designated generally by the reference numeral 24 is journalled in the side members between the stretcher rods 14 and 15, and a front roller made in sections, designated generally by the numeral 27, is journalled in the side members between the cutter 20 and the front stretcher rod 13.

A power-unit designated generally by the numeral 30, in the form of an air- and water-cooled internal-combuston engine, for driving the cutter 20 and back roller 24 is detachably supported on the back and middle stretcher rods 14, 15 by readily detachable fastening devices, in such a manner that it can be readily removed in case of need. For this purpose the crank-case is formed or provided with two arms 31, 32 respectively extending fore and aft of the machine. The rear arm 32 terminates in a clip that is designated generally 35 and comprises a fixed jaw 33 and a movable jaw 34, which jaws are of arcuate cross-section and embrace the back stretcher rod 34, the jaw 33 is longer than the jaw 34 and makes contact only at its ends with the rod 14; the movable jaw 34 which is pivoted to the fixed jaw 33 can be closed on the stretcher rod by a single bolt 36 that is pivoted on the fixed jaw 33 and extends through a hole in the movable jaw 34. The front arm 31 of the crank-case is detachably secured to the middle stretcher rod 15 by a like clip 37 except that its fixed jaw 38 having a bolt 39 is much shorter than the jaw 33 of the clip 35 and contacts with its stretcher rod 15 along the entire length of the clip. Guiding surfaces for controlling the motion of withdrawal and replacement of the engine are constituted by the inner faces of the fixed jaws aforesaid and by the peripheries of the rods 14 and 15 which constitute guiding devices. The motor is thus supported on the frame at three situations lying at the angles of a triangle, so that even if the stretcher rods 14, 15 carrying it flex laterally the motor will not be subjected to any material bending stresses and the alignment of its bearings will not be affected. Further, to release the motor from the frame it is necessary to loosen only two bolts 36 and 39. If desired the clip 35 affording two points of support may engage the rod 15 and the clip 37 may engage the rod 14, but the arrangement illustrated is that preferred.

The preferred construction of power-unit, as shown in Figures 1, 2 and 3, is a water-cooled internal-combustion engine 30 wherein a relatively small water-supply tank 40 shaped like a circular bowl is formed or provided directly on the water-jacket 41 forming part of the head of the engine, and is open above to the atmosphere and is preferably situated in view of the operator of the mower when the machine is in use. The employment of a radiator is thus obviated; the water simply boils away and can be readily replenished when needed, because a lawn-mower when in use is always not far from a water supply; and the water tank can be readily seen by the operator, it being preferably always under his eye when in use. In this way a satisfactory engine is obtained without any material addition to the weight of the mower, and furthermore a readily detachable motor can be used without having to break complicated water joints or the like such as are likely to be beyond the capacity of the ordinary gardener to attend to.

The engine 30 cooled as aforesaid is disposed in a slanting position and the body of the water-jacket 41 is, for the purpose described hereinafter, in the form of an annular chamber at the cylinder head and surrounds only a short length of the cylinder 42 at the end adjacent the head, and the supply tank 40 opens into the upper portion of the said annular chamber. The purpose of using an annular chamber is to leave the centre of the cylinder head, which may be a detachable aluminium head, free for the ignition plug which is thus readily accessible and yet will be efficiently cooled by the jacket which is kept of small dimensions and nevertheless ensures good circulation. The tank or water pot 40 is preferably of hemispherical shape and may be integral with the body 41 of the jacket.

An impeller 43, for example a radial flow impeller, is preferably arranged to be driven by the engine crank-shaft 44 for producing a blast of air and means are provided for directing the blast against that portion of the body of the cylinder 42 not surrounded by the water jacket 41. As illustrated, this impeller 43 is in the form of a fly-wheel mounted on the crankshaft and has cast in it radial passages that open at one end through the periphery and at the other end through a side face of the fly-wheel, and the blast-directing means is in the form of a casing 45 surrounding the fly-wheel, which casing has an axial inlet at 46 and an outlet at 47 so arranged that a current of air is induced by the impeller to flow past the crank case for cooling the latter. When the engine cylinder is partly water cooled and partly air cooled as described above, the body of the cylinder below the water jacket is preferably provided with the usual cooling fins 48 on to which the blast is directed. The casing 45 surrounding the impeller is secured as by bolts in any convenient manner to the crank case 49.

Any convenient construction of driving gear may be provided for operatively connecting the motor 30 with the rotary cutter 20 and the driving roller 24. A preferred construction is that described and claimed in my co-pending patent application Serial No. 177,791, from which the present application has been divided out. This construction comprises a main driving shaft 51 arranged to drive the cutter and back roller at different speeds. This driving shaft 51 is the "fixed-centre" driven shaft referred to above; it lies parallel with the said stretcher rods 13, 14, 15 and is engaged directly by a coupling 52, 53 with the motor crank-shaft 44 which is also parallel with the stretcher rods. This coupling 52, 53 may be a slip coupling of any convenient construction that enables the two shafts 44, 51 to be disengaged and engaged by a simple movement of the motor in a direction parallel with the stretcher rods or in a direction at right-angles thereto. As illustrated the slip coupling takes the form of a self-aligning coupling of the Oldham type, whereof one element 53 is formed on an impeller 43 carried by the crank-shaft and the other element 52 is fast on the adjacent end of the shaft 51.

The driving gear aforesaid comprises power-transmission means designated generally by the numeral 55 (Figure 2) connecting the main shaft 51 with the rotary cutter 20, and separate power-transmission means designated generally by the numeral 56 (Figure 2) connecting the main shaft 51 with the back roller 24. The side frame member 12 is formed as a casing for housing these transmission means 55, 56, and the upper part of the rear end of this casing 12 preferably constitutes a change-speed gear-box 57 in which said main driving shaft 51 is journalled in two ball-bearings 58, so that its axis of rotation is fixed in relation to the frame of the mower.

An engine exhaust silencer 160 extends across the machine and has an elbow 164 at its centre with a slip connection at 161 (Figures 2 and 3) with the exhaust pipe of the engine which is arranged in the direction of withdrawal of the power-unit and parallel to the crank-shaft. A petrol-tank 162 mounted on the handles 98 is connected to the carburetor 165 so as to be readily disconnected therefrom. For starting the engine a handle may be applied to what is virtually the free end of the shaft 51 having a notch 163 for engagement by it.

It will be appreciated that the invention provides a power-driven lawn-mower suitable to be put in the hands of an unskilled operator. The engine can be readily removed and replaced on the frame by any person without the exercise of any mechanical skill, and owing to the water cooling being arranged as described no difficulty whatever is experienced in connection with a radiator such as is used in motor-car practice.

Various defects, such as high centre of gravity, considerable addition of weight on the mower and increase in cost of manufacture and maintenance, due to the use of a water-cooled motor having a radiator arranged as usual in motor-car practice are avoided by the improved construction, in which various modifications may be made without departing from the scope of the invention as defined in the claims. With regard to Figure 4, it will be noted that this is a horizontal section taken through the lower part of the invention and through its supporting arms 31, 32, each having a clip. The fixed part 33 of the rear clip is shown broken away to indicate that the head 33 makes contact only at its ends with the rod 14, and thus provides two points of support spaced apart.

I claim:

1. In a power-unit-driven lawn-mower, the combination of a frame, a rotary cutter journalled therein, a power-unit that has a driving shaft and is withdrawably mounted on the frame, transmission means comprising a "fixed-centre" driven shaft for driving the rotary cutter, quick-release clamping means for securing the power-unit on the frame, guide means for controlling the motion of withdrawal and replacement of the power-unit out of and into its driving position on the frame in a direction parallel with said driven shaft, and a readily separable driving connection that operatively connects said driving and driven shafts in a line and is separable by the controlled motion of withdrawal of the power-unit.

2. In a power-unit-driven lawn-mower, the combination of a frame, a rotary cutter journalled therein, a power-unit that has a driving shaft and is withdrawably mounted on the frame, transmission means comprising a "fixed-centre" driven shaft for driving the rotary cutter, quick-release clamping means for securing the power-unit on the frame, guide means for controlling the motion of withdrawal and replacement of the power-unit in a predetermined direction out of and into its driving position of the frame, a readily separable driving connection that operatively connects said driving and driven shafts, an exhaust silencer on the frame, a readily separable exhaust connection between the power-unit and the silencer, which driving and exhaust connections are separable substantially simultaneously by the controlled motion of withdrawal of the power-unit.

3. In a power-unit-driven lawn-mower, the combination of a frame, a rotary cutter journalled therein, a power-unit that has a driving shaft and is withdrawably mounted on the frame at three situations arranged at the angles of a triangle, transmission means comprising a "fixed-centre" driven shaft for driving the rotary cutter, quick-release clamping means for securing the power-unit on the frame at said three situations, guide means for controlling the motion of withdrawal and replacement of the power-unit in a predetermined direction out of and into its driving position on the frame, and a readily separable driving connection that operatively connects said driving and driven shafts and is separable by the controlled motion of withdrawal of the power-unit.

4. In a power-unit-driven lawn-mower, the combination of a frame, a rotary cutter journalled therein, a power-unit that has a crankshaft and is withdrawably mounted on the frame, transmission means comprising a "fixed-centre" driven shaft for driving the rotary cutter, quick-release clamping means for securing the power-unit on the frame, guide means for controlling the motion of withdrawal and replacement of the power-unit out of and into its driving position of the frame in the direction of length of said driven shaft, a readily separable driving connection in the form of a self-aligning coupling that operatively connects said crankshaft end-to-end in a line and driven shaft and is separable by the controlled motion of withdrawal of the power-unit.

5. In a power-unit-driven lawn-mower, the combination of a frame, a rotary cutter journalled therein, a power-unit that has a driving shaft and is withdrawably mounted on the frame, transmission means comprising a "fixed-centre" driven shaft for driving the rotary cutter, brackets on the power-unit extending transversely of the driving shaft, quick-release clamping means on said brackets for securing the power-unit on the frame, guide means comprising two slide-bars constituting cross members of the frame for controlling the motion of withdrawal and replacement of the power-unit in a predetermined direction out of and into its driving position on the frame, and a readily separable driving connection that operatively connects said driving and driven shafts and is separable by the controlled motion of withdrawal of the power-unit, which clamping means comprises at least two clamping devices each in the form of a clip comprising two jaws, whereof one is on a said bracket on the power-unit and the second is movable thereon, and a nut-equipped bolt for holding the jaws closed on a said cross bar of the frame.

6. In a power-unit-driven lawn-mower, the combination of a frame comprising two slide-bars constituting cross members, a rotary cutter journalled in said frame, a power-unit having a driving shaft parallel with said slide-bars, transmission means comprising a driven shaft parallel with said driving shaft for driving the rotary cutter, quick-release clamping means in the form of clips for securing the power-unit on said slide-bars, which slide-bars and the clips co-operating therewith constitute guide means for controlling the motion of withdrawal and replacement of the power-unit in a predetermined direction out of and into its driving position on the frame, and a readily separable driving connection in the form of a self-aligning coupling that operatively connects the said driving shaft with said driven shaft and is separable by the aforesaid controlled motion of withdrawal of the power-unit.

7. In a power-unit-driven lawn-mower, the combination of a frame, a rotary cutter journalled therein, an internal-combustion engine withdrawably mounted in a slanting position on said frame, which engine has a water jacket in the form of an annular chamber at the cylinder head surrounding only a short length of the cylinder, and a water-supply tank of the hopper type that is carried by the cylinder head and is open above to atmosphere and opens below into the upper portion of the body of the said water-jacket, transmission means comprising a driven shaft that is co-axial with the engine crankshaft and is to be driven thereby and is arranged to drive the rotary cutter, quick-release clamping devices for securing said engine on the frame, guiding surfaces for controlling the motion of withdrawal of the engine out of its driving position on the frame in the direction of length of said driven shaft, and a readily separable coupling that operatively connects said crankshaft and driven shaft end-to-end in a line and is separable by the controlled motion of withdrawal of the engine.

8. In a power-unit-driven lawn-mower, the combination of a frame, a rotary cutter journalled therein, an internal-combustion engine withdrawably mounted in a slanting position on said frame, which engine has a water-jacket in the form of an annular chamber at the cylinder head surrounding only a short length of the cylinder, and a water-supply tank of the hopper type that is carried by the cylinder head and is open above to atmosphere and opens below into the upper portion of the body of said water-jacket, a radial-flow impeller constituted by a flywheel on the engine crankshaft for producing a blast of air, means for directing the blast against that portion of the body of the engine cylinder not surrounded by the water-jacket, transmission means comprising a driven shaft that is co-axial with the engine crankshaft and is to be driven thereby and is arranged to drive the rotary cutter, quick-release clamping means for securing said engine on the frame, guiding surfaces for controlling the motion of withdrawal of the engine out of its driving position on the frame in the direction of length of said driven shaft, and a readily separable coupling that operatively connects said crankshaft and driven shaft end-to-end in a line and is separable by the aforesaid controlled motion of withdrawal of the engine.

9. A combination of parts as set forth in claim 8, wherein the blast-directing means is in the form of a casing surrounding the impeller, which casing has an inlet so arranged that a current of air is induced by the impeller to flow past the engine crank-case for cooling the latter.

In testimony whereof I affix my signature.

ARTHUR ERNEST JERRAM.